Patented Aug. 15, 1933

1,922,206

UNITED STATES PATENT OFFICE 1,922,206

2-CARBOXY-5-NITRO DIPHENYL

William S. Jones and William Braker, Brooklyn, N. Y., assignors to E. R. Squibb & Sons, Brooklyn, N. Y., a Corporation of New York No Drawing. Application February 15, 1932
Serial No. 593,191

1 Claim. (Cl. 260—108)

This invention relates to 2-carboxy-5-nitro diphenyl. This compound has proved valuable particularly as an intermediate in the production of therapeutically active compounds.

The new compound is advantageously prepared by diazotizing 2-amino-5-nitro diphenyl, and then treating the diazotized product with a cyanide to form the nitrile which is 2-cyano-5-nitro diphenyl. The nitrile is next hydrolized to form the desired carboxylic acid. The reaction is indicated by the following equation:

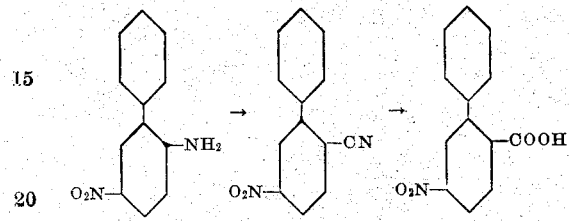

The 2-amino-5-nitro diphenyl which is used as the starting material may be prepared by the method given in the Journal of the Chemical Society, vol. 2, 1928, page 2774, or preferably by hydrolysis of 5-nitro-2-para-toluene sulfonamido diphenyl.

25.0 grams of 2-amino-5-nitro diphenyl is dissolved in 24.0 cc. of hydrochloric acid (concentrated) contained in 75 cc. of water. The solution is diazotized with 10.44 grams of sodium nitrite; the excess nitrite is destroyed by the addition of solid urea. This diazonium solution is added over a period of about one-half hour to a solution of potassium copper cyanide kept at 90° C. This cyanide solution may be prepared by dissolving 50.0 grams of crystalline copper sulfate and 56.0 grams of potassium cyanide in sufficient water to bring the total to 300 cc. The reaction mixture is heated for six hours during which a crop of brown crystals form. These crystals are filtered and washed free of inorganic matter. The nitrile, viz. 2-cyano-5-nitro diphenyl thus obtained is recrystallized from alcohol. This compound has been found to have a melting point of 132–134° C.

5.2 grams of the nitrile is suspended in a solution consisting of 75 cc. of glacial acetic acid, 60 cc. of sulfuric acid and 50 cc. of water. The mixture is refluxed for about eight hours. The resulting solution is diluted with an equal volume of water. The hydrolysis of the nitrile produces a crystalline substance which is filtered off. This compound is washed with water and dried in vacuo. It is the 2-carboxy-5-nitro diphenyl.

Our copending application, Serial No. 632,789 filed September 12, 1932, refers to a therapeutically active compound prepared from 2-carboxy-5-nitro diphenyl.

We claim:
2-carboxy-5-nitro diphenyl.

WILLIAM S. JONES.
WILLIAM BRAKER.